US008620475B2

(12) United States Patent
Marchetto et al.

(10) Patent No.: US 8,620,475 B2
(45) Date of Patent: Dec. 31, 2013

(54) OPERATING SYSTEM FOR ROLLER BLINDS WITH PROTECTION AGAINST EXCESSIVE WIND

(75) Inventors: Oscar Marchetto, Oderzo (IT); Alberto Codognotto, Cessalto (IT)

(73) Assignee: Nice S.p.A., Oderzo (Treviso) (IT)

( * ) Notice: Subject to any disclaimer, the term of this patent is extended or adjusted under 35 U.S.C. 154(b) by 277 days.

(21) Appl. No.: 12/812,289

(22) PCT Filed: Dec. 16, 2008

(86) PCT No.: PCT/IB2008/055346
§ 371 (c)(1),
(2), (4) Date: Jul. 9, 2010

(87) PCT Pub. No.: WO2009/087512
PCT Pub. Date: Jul. 16, 2009

(65) Prior Publication Data

US 2010/0280666 A1 Nov. 4, 2010

(30) Foreign Application Priority Data

Jan. 10, 2008 (IT) .............................. TV2008A0004

(51) Int. Cl.
*G05B 13/00* (2006.01)

(52) U.S. Cl.
USPC ............................ 700/275; 160/310; 318/466

(58) Field of Classification Search
USPC ............................ 700/275; 160/310; 318/466
See application file for complete search history.

(56) References Cited

U.S. PATENT DOCUMENTS 5,307,856 A 5/1994 Murray
5,848,634 A * 12/1998 Will et al. .................... 160/310

(Continued)

FOREIGN PATENT DOCUMENTS

DE 9003416 U1 6/1990
DE 9306368 U1 7/1993

(Continued)

OTHER PUBLICATIONS

"PCT International Search Report dated Apr. 20, 2009 for PCT/IB2008/055346, from which the instant application is based," 3 pgs.

(Continued)

*Primary Examiner* — Mohammad Ali
*Assistant Examiner* — Anthony Whittington
(74) *Attorney, Agent, or Firm* — Fredrikson & Byron, P.A.

(57) ABSTRACT

A control method is described, said method being used within an operating system (10) for roller blinds (20) or the like having an output shaft (SH) of a motor (M) which transfers rotational movement to a drum (40) onto which the roller blind is wound, said method comprising the following steps: —(i) detecting directly or indirectly the force acting on the drum, or on a member connected thereto, and/or the relative position of the drum, or of a member connected thereto, with respect to a part which is fixed and/or integral with the operating system; —(ii) obtaining from the detection operation performed in step (i) a zero value (RZ) representing a stable rest condition of the roller blind; —(iii) starting an automatic closing movement of the roller blind should said force and/or said relative position (RR) vary, with respect to the value (RZ) obtained during step (ii), beyond a predefined threshold (T). The method simplifies the constructional design and installation of the operating system, while providing it with protection against wind and impacts.

27 Claims, 2 Drawing Sheets

(56) References Cited

U.S. PATENT DOCUMENTS

| | | | | |
|---|---|---|---|---|
| 6,201,364 | B1 * | 3/2001 | Will et al. | 318/466 |
| 2002/0174961 | A1 * | 11/2002 | Anderson et al. | 160/178.1 R |
| 2003/0069670 | A1 * | 4/2003 | Osinga | 700/275 |
| 2005/0072635 | A1 * | 4/2005 | Toti | 185/10 |
| 2005/0103526 | A1 * | 5/2005 | Ayling | 175/52 |
| 2005/0119792 | A1 * | 6/2005 | Maistre et al. | 700/275 |
| 2005/0269041 | A1 * | 12/2005 | Anderson et al. | 160/121.1 |
| 2006/0012319 | A1 * | 1/2006 | Bouix et al. | 318/16 |
| 2006/0132072 | A1 * | 6/2006 | D'Ayot | 318/283 |
| 2006/0237152 | A1 * | 10/2006 | Hansen et al. | 160/370.22 |
| 2007/0000624 | A1 * | 1/2007 | Hansen et al. | 160/370.22 |
| 2008/0053628 | A1 * | 3/2008 | Anderson et al. | 160/238 |
| 2008/0191658 | A1 * | 8/2008 | Bruno | 318/779 |
| 2008/0216972 | A1 * | 9/2008 | Starzmann et al. | 160/310 |

FOREIGN PATENT DOCUMENTS

| | | | |
|---|---|---|---|
| DE | 19904226 | A1 | 8/2000 |
| DE | 10033831 | A1 | 3/2001 |
| EP | 1069257 | A2 | 1/2001 |
| FR | 2792794 | A1 | 10/2000 |
| WO | 2007051865 | A1 | 5/2007 |

OTHER PUBLICATIONS

"PCT Written Opinion dated Apr. 20, 2009 for PCT/IB2008/055346, from which the instant application is based," 4 pgs.

* cited by examiner

OPERATING SYSTEM FOR ROLLER BLINDS WITH PROTECTION AGAINST EXCESSIVE WIND

RELATED APPLICATIONS

This application is a 35 U.S.C. 371 national stage filing from International Application No. PCT/IB2008/055346 filed Dec. 16, 2008, which claims priority to Italian Application No. TV2008A000004, filed Jan. 10, 2008, the teachings of which are incorporated herein by reference.

TECHNICAL FIELD

The invention relates to an operating system for roller blinds in general, such as, for example, awnings and rolling shutters equipped with protection against wind, impacts or excessive vibrations (or stresses in general). By way of an example of a roller blind in the description reference will be made to an awning.

BACKGROUND

The automated systems for awnings generally envisage the use of a gear motor for moving the awning and an associated wind or vibration sensor.

Control of the external stresses acting on the awning, for example due to atmospheric phenomena, is important in order to protect its structure. The greater the surface area of the awning the greater is the force exerted on the mechanical structure, usually a folding arm, supporting it. Basically the awning acts in the manner of a sail. The stresses transmitted from the awning to the structure or to the gear motor may damage them unless the awning is promptly and automatically retracted.

In the known art there are many automatic retraction systems.

U.S. Pat. No. 5,307,856 envisages the installation of a sensor operationally connected to and forming an integral part of the arm of the awning.

DE19904226 describes a controller for detecting vibrations induced on the arm by the wind, which is situated in a corner of the window. Detection of the vibrations is performed by means of a photosensor.

EP1069257 envisages an awning control system equipped with a vibration sensor or accelerometer situated on an extendable arm.

DE19991032729 envisages an anemometer for controlling and operating an awning.

FR2792794 envisages a vibration and impact detector arranged in the structure which is at the free end of the awning support arm.

In other cases, as in U.S. Pat. No. 5,307,856 and EP1069257, the detection device or sensor is included within the mechanical structure of the awning, for example in the extendable arms.

If installed inside the extendable arms, the device/sensor constitutes an unnecessary cost for all those users who do not intend automating the awning. It is not possible to remove the device/sensor. Moreover this type of installation is not devoid of drawbacks since the device or sensor must be adapted to the type of extendable arm and must necessarily be connected to the electrical power line and to the unit which controls the awning motor.

Other accessory devices installed on the outside of the awning structure are, on the other hand, advantageous since the user has the choice of purchasing them or not, but they constitute an additional cost which the user must bear at the time of installation. Powering and connection to the motor control unit of the electrical mains devices is particularly difficult and costly. If powered by batteries and provided with a wireless connection to the motor, the device or sensor must be able to be easily controlled constantly by the user in order to prevent interruption of operation without warning, an event which could have disastrous consequences for the awning. In some cases checking the battery of the device and replacing it may be dangerous, as for example in the case of sun awnings which are situated on the outside of a multi-storey building.

Often awning retailers sell their products in combination with a particular motor/operating system made by a certain company such that the motor/operating system is provided ad hoc or to suit a specific need. Therefore the manufacturers of automated systems must provide specially designed wind, vibration or impact sensor devices for each awning or a universal device which may be used for all awnings. The costs of providing and managing this type of service may be considerable.

BRIEF SUMMARY OF EMBODIMENTS OF THE INVENTION

The object of the invention is to provide (i) a method to be used in an operating system for roller blinds and (ii) an operating system with a wind, vibration or impact detection device for implementing the method, which overcome some of the disadvantages mentioned.

This object is achieved by means of a control method used within an operating system for roller blinds or the like having an output shaft of a motor which transfers rotational movement to a drum onto which the roller blind is wound, said method comprising the following steps:

(i) detecting directly or indirectly (i.e. on another mechanical member connected to it and suitable for the purpose) the force acting on the drum, or an a member connected thereto, and/or the relative position of the drum, or of a member connected thereto, with respect to a part which is fixed and/or integral with the operating system;

(ii) obtaining from the detection operation performed in step (i) a zero value (RZ) representing a stable rest condition of the roller blind;

(iii) starting an automatic closing movement of the roller blind should said force and/or said relative position (RR) vary, with respect to the value (RZ) obtained during the step (ii), beyond a predefined threshold/tolerance (T).

The step (i) has by way of preferred variants:

detecting as a relative position of the drum its angular position relative to a fixed point (for example by means of an angular position sensor and creating or making use of a small (including micrometric) angular play between drum and shaft of the motor);

detecting the force acting on the drum and/or on other components inside the operating system suitable for this purpose by means of measurement of the torque imparted to it/them and/or the torsional load (via torque sensors and/or load cells and/or encoders and/or one or more strain gauges);

in step (i) the position of the drum within a mechanical play obtained during connection between the drum and the motor shaft is detected.

Other variants, which will be described more fully below, are obtained when:

automatic closing of the roller blind occurs in several stages, its travel path being divided into several control points {P1 . . . Pn} where the step (i) is performed and at said points the roller blind stops and it is checked again whether the stress which caused the start of the closing movement is present;

said predefined threshold/tolerance (T) is programmed at the discretion of a user and/or said predefined threshold (T) belongs to a set of threshold values {T1 . . . Tn};

the values of said set of threshold values {T1 . . . Tn} may be associated univocally with control points {P1 . . . Pn} along the travel path of the roller blind;

during installation of the operating system a time profile of the values of the force acting on the drum and/or its torsional load and/or said relative position of the drum is stored by means of sampling and, during a subsequent time interval for mechanical stabilization of the awning, in step (iii) the said threshold (T) is applied to the values thus sampled;

detection of said zero value (RZ) during step (i) is delayed for a predetermined, fixed or variable, time delay ($T_{del}$) so as to allow lapsing of the time for mechanical stabilization of the roller blind;

if said force and/or said relative position (RR) vary, with respect to the value (RZ) obtained during step (ii), beyond a predefined threshold (T), a subroutine containing commands for responding to a presumed break-in which has occurred is initiated;

during step (ii) said value (RZ) is obtained as a temporal mean of various samples acquired and, during step (iii), the variance of the samples from said mean is calculated and the difference is then compared with said threshold (T).

An advantageous embodiment of the invention consists also in positioning an encoder with a very high angular resolution and/or a strain gauge and/or load cell between the parts 530 and 570 (or directly on them in order to detect the deformation under load) as shown in FIG. 18 of WO2007/051865, relating to an operating system already designed by the Applicant.

The method according to the invention may be effectively used as a control system for unauthorized entry/break-in. In fact any forced movement of the shutter or blind is also detected when the motor is not running.

The invention also relates to an operating system for roller blinds or the like, having an output shaft of a motor which transfers rotational movement to a drum onto which the roller blind is wound, the operating system comprising a device for protection against vibrations or impacts acting on the roller blind and caused by external agents, characterized in that the protection device comprises:

a sensor able to detect directly or indirectly (i.e. on another component kinematically connected to and/or integral with the drum) the force acting on the drum, or on a member connected thereto, and/or the relative position of the drum, or of a member connected thereto, with respect to a part which is fixed and/integral with the operating system;

in a processing unit preset to (i) obtain from said detected value a zero value (RZ) representing a stable rest condition of the roller blind and (ii) perform an automatic closing movement of the roller blind should said force and/or said relative position (RR) vary, with respect to said value (RZ), beyond a predefined threshold/tolerance (T).

Preferred variants of the operating system comprise cases where:

said unit is preset to read the data of the sensor when the motor is not running or only when the motor is not running;

comprises a mechanical play in the connection between the drum and the shaft of the motor and a sensor able to detect the position of the drum within this play;

comprises a sensor able to detect the force acting on the drum (or other component suitable for the purpose) by means of measurement of the torque and/or the torsional load imparted thereto;

the unit is programmed to perform automatic closure of the roller blind in several stages, dividing the travel path of the roller blind into several control points {P1 . . . Pn} where the roller blind is stopped and said sensor interrogated, checking again whether the stress which caused the start of the closing movement is present;

comprises a programming interface for allowing a user to program said threshold (T);

comprises a memory for recording a set of separate threshold values {T1 . . . Tn} to be used as operands for said predefined threshold (T);

the values of said set of threshold values {T1 . . . Tn} may be associated univocally with control points {P1 . . . Pn} along the travel path of the roller blind;

comprises sampling means for storing, during installation of the operating system, a time profile of the values read by the sensor, the unit being programmed to apply said predefined threshold (T) to the values thus sampled during a subsequent time interval for mechanical stabilization of the awning;

the unit is programmed to (i) detect said value (RZ) with a predetermined, fixed or variable, time delay ($T_{del}$) so as to allow lapsing of a time for mechanical stabilization of the roller blind and/or (ii) perform a subroutine containing commands for managing a presumed break-in which has occurred, should said relative position (RR) vary, with respect to said value (RZ), beyond a predefined threshold ($T_m$); and/or (iii) obtain as a temporal mean of various samples acquired by the sensor the zero value and calculate the variance of the samples from said mean and then compare the difference with said predefined threshold (T);

said sensor comprises a load cell and/or a strain gauge positioned on the output shaft or between the motor head and the associated wall support or on any component of the motor subject to forces induced by the awning or shutter.

Advantageously and preferably the protection device is incorporated inside the operating system and therefore avoids;

the use of any further additional device to be installed in the structure of the roller blind;

costly and complex additional wiring;

additional costs for the purchase of accessories.

The device is powered by the line which powers the motor and therefore very easily and without costs.

Therefore the invention avoids any further complication during installation: the automated system according to the invention requires only the electrical connection for the operating system (as in the prior art).

FIGS. 3 and 4 show two preferred variants of the invention to be used on their own or in combination.

The first variant (FIG. 3) makes use of an angular mechanical play between the shaft (ref. SH) and the drum (ref. 40) which has a maximum amplitude MP of a few degrees, for example 5 degrees. MP is shown as an arc between vectors which indicate the angular position.

It is possible and preferable to provide within the play a resilient element as in WO2007/051865. The angular play may also consist only of the natural play due to the tolerances of the parts. The angular position of the drum 40 is detected by a sensor SS1.

When the roller blind is stationary the drum 40 and the shaft SH assume a stable relative angular position RZ (see vector in the centre) which may be considered to represent a zero reference value determined by the weight of the roller blind and/or by the tension of the awning. In this state the drum 40 is stationary, but movement is possible with respect to the shaft SH in a clockwise or anti-clockwise direction within and owing to the play.

The detection device SS1 therefore detects between the shaft SH and the drum 40 a constant angular difference RZ, without variations. The value of the constant angular distance RZ assumes and is interpreted therefore as being a zero reference value (awning or roller blind in a static condition, not subject to stresses).

The action of the wind or any impacts acting on the roller blind cause a variation with respect to RZ in the values detected by the detection device SS1 (vector shown in broken lines). In the case of significant deviations, i.e. beyond a preset threshold or tolerance value T with respect to the rest state RZ, automatic closing of the roller blind is activated. In the case of small deviations, below the threshold T, the system does not react.

In short, if RR is defined as a current value for the relative angular position of the shaft SH and the drum 40, the system intervenes if the result of the verification operation $|RZ-RR|>T$ is positive.

Automatic closing may be performed by closing completely the roller blind as far as the end-of-travel stop or may be managed in several stages/steps. The travel path of the roller blind may be divided into several control points {P1 . . . Pn} where the roller blind is stopped/positioned and at the same time it is checked again whether the stress which started the closing movement is present. If the stress is still present, closing of the roller blind continues, but otherwise there exists the option of (i) interrupting the closing movement (stress no longer present) and leaving the roller blind stationary in its current position or (ii) bringing the roller blind back into its initial position.

The threshold T may be fixed, programmable by the user or belong to a set of threshold values {T1 . . . Tn} associated univocally with the points {P1 . . . Pn) used in each case for the verification operation of a point Pi∈{P1 . . . Pn}.

Preferably the protection device comprises a processing unit (e.g. a microprocessor) programmed to manage its functions where necessary with those of the entire operating system. With the processing unit it is possible to perform mathematical calculations in order to obtain sophisticated verification operations (see following description) and activate an intelligent response from the operating system.

In the second variant (FIG. 4) parts which are identical to the first variant have the same reference numbers. The same decisional and processing model as that of first variant as well as all the components mentioned are maintained. However, a different sensor, SS2, or a strain gauge and/or a load cell is used, in order to provide the detection system with a greater sensitivity (micro movements are detected). It may happen in some practical situations in fact that the variation in tension of the awning and the elasticity of the arms which support it do not cause a significant angular displacement.

The sensor SS2 is positioned preferably at the mechanical interface (for example coupling surfaces) which connect the drive shaft SH to the drum 40 or on the supports of the drum 40 so as to capture the stresses acting thereon as directly as possible. For this purpose it is also possible to use all the components of the motor which are subject to forces or are in movement.

The shaft SH and/or the supports are considered in the example to be the fixed reference system and the vectors generally indicate a positional parameter.

As before, when the roller blind is stationary the drum 40 and the shaft SH assume a constant relative position.

The value provided by the sensor SS2 is recorded and interpreted as being a zero reference value RZ.

When the roller blind is acted on by wind or impacts a displacement of the drum 40 occurs with respect to the shaft SH (translation or rotary translation) and there is a corresponding variation in the value provided by the device SS2 (vector in broken lines).

For values beyond a threshold T compared to the rest/zero state, automatic closing of the roller blind is activated. If RR is defined as the current value provided by the sensor SS2, the system intervenes if the result of the verification operation $|RZ-RR|>T$ is positive.

One embodiment of the first variant, which exploits an angular mechanical play, consists for example in the use of the devices described and claimed in WO2007/051865: first device in FIGS. 1 to 17, second device in FIGS. 18 to 23, the preferred embodiment being the second one. By way of further variants applied to this embodiment, it is possible to envisage the use of load cells or strain gauges instead of the angular position sensors.

Advantageously during installation it possible to store (or "map" by means of sampling) a time profile of the values of the force acting on the drum and/or its torsional load and/or its position. An indirect measurement of the tension of the awning as a function of time is performed.

This tension, immediately after the motor has stopped, oscillates for a certain period of time owing to mechanical stabilization of the awning and then decreases gradually towards the stable value RZ.

Detection of RZ may occur in two ways:

- a predetermined time delay $T_{del}$ during which the protection is inactive is established and, after this has lapsed, RZ is acquired. $T_{del}$ may be fixed or variable, for example by means of external programming;
- in order to avoid having a time window in which the system does not "protect" the awning, it is possible to create a map during the awning stabilization period for the values produced by the sensors SS during the first installation operation. Then, during the mechanical stabilization interval, the threshold T will be applied to the values of the map, i.e. a sample $C_1$ of the map is taken as an instantaneous value RZ and it is checked whether $|RR_i-C_i|>T$. It should be noted that in this case also the value $RR_i$ is indexed, meaning that the comparison operation is performed between an i-th sample $C_i$ and the corresponding value $RR_i$ detected at an i-th instant, with $1<i\leq Q$, Q being the number of samples in the stabilisation period.

BRIEF DESCRIPTIONS OF THE DRAWINGS

The advantages of the invention will be clarified more fully in the following description of a preferred embodiment of the operating system, illustrated in the accompanying drawing in which.

DETAILED DESCRIPTION OF EMBODIMENTS OF THE INVENTION

Figure 1:
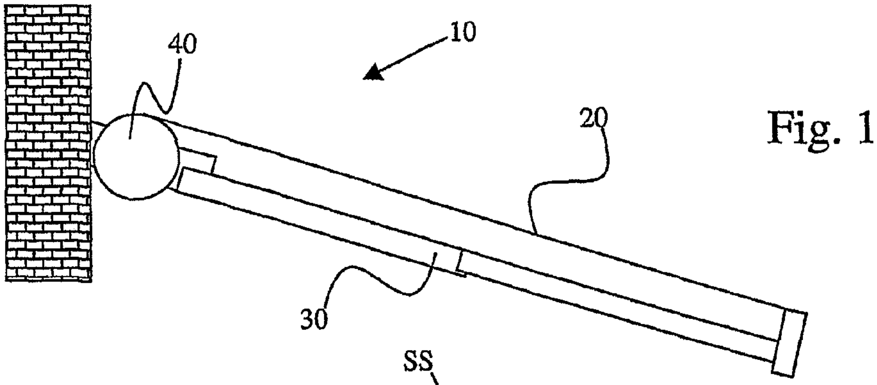
FIG. 1 shows a side view of the operating system.
Figure 2:
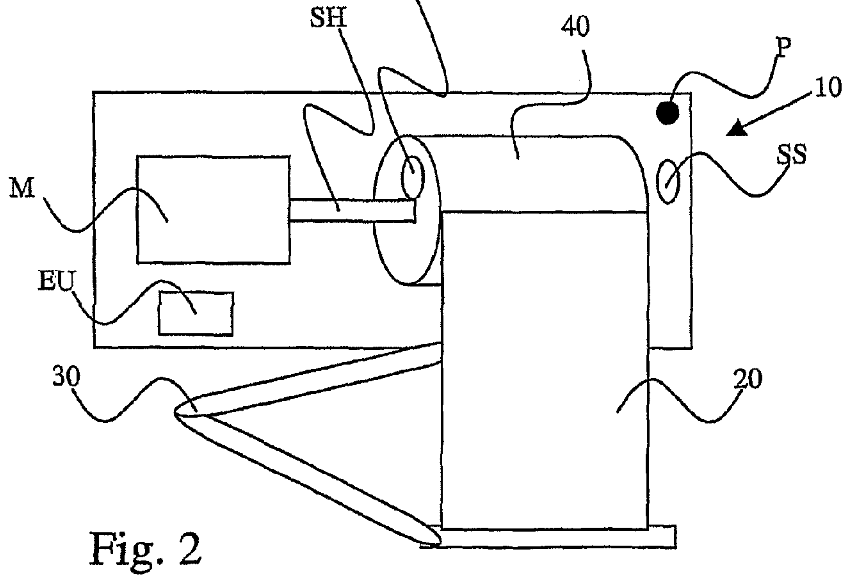
FIG. 2 shows a general schematic view of the operating system according to FIG. 1.
Figure 3:
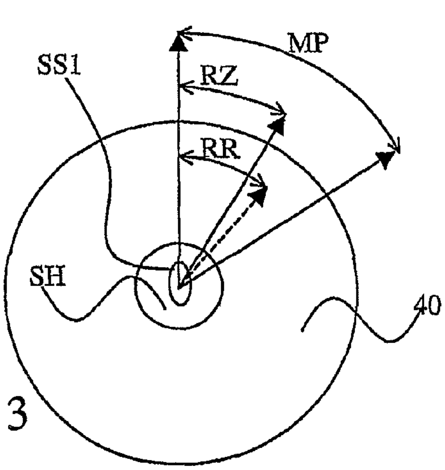
FIGS. 3 and 4 show a schematic view of two variants for parts of the operating system according to FIG. 1.
Figure 4:
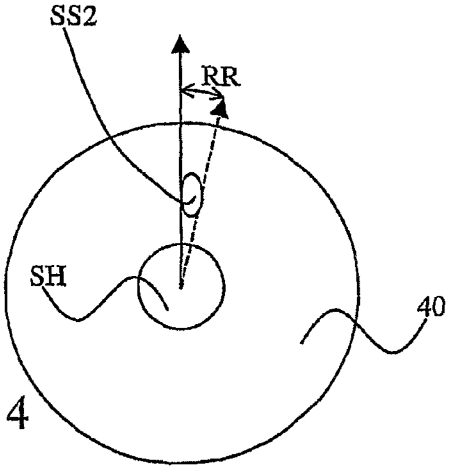

An operating system 10 comprises (see FIGS. 1 and 2):

an electric motor M which operates a drum 40 by means of an output shaft SH;

one or more folding arms 30, each formed by two or more articulated sections;

an awning 20 which is wound onto the drum 40 and has one edge fixed to the free end of the arms 30;

a position detector SS which has the function of determining the position of the drum 40 with respect to the shaft SH and/or a fixed point P of the operating system 10. The detector SS for this purpose must be mounted in a suitable position, for example on the shaft SH or inside the operating system 10;

a microprocessor EU which receives data from the detector SS and controls the motor M.

As already mentioned, when the roller blind stops, the drum 40 and the shaft SH assume a constant relative position RZ. The drum 40 is stationary, but may, as a result of the external force of the wind, move with respect to P or the shaft SH.

The microprocessor EU, as soon as the motor M stops, detects the position RZ and regards it as a zero position. Then the microprocessor EU continues to receive the position data and evaluate it.

In the rest condition and without wind, the detection device SS continues to detect RZ, without variations and the microprocessor EU remains inactive.

The action of the wind or any impacts acting on the awning are necessarily transmitted onto the drum 40 which moves with respect to the shaft SH and/or the point P from the position RZ into a different position RR (see vector in broken lines).

This variation is detected by the microprocessor EU which, depending on the result of an internal processing operation, decides what action to take.

A possible decisional procedure considers the value of the operation |RZ−RR|>T, T being the defined threshold/tolerance. If verified as such, the microprocessor EU starts to close the awning again.

Clearly the system may be modified to read the data if the sensor SS used consists of a sensor such as SS1 or SS2, or a combination of the two, or a telemetric sensor such as a light source/reflector pair. The logic management and the control flow do not change.

For this reason, in this section and the remainder of the text, "sensor SS" is used to indicate generally a sensor which is not specific, but is able to output data regarding the position of the drum 40 (or other components connected to it and suitable for the purpose) consistent with the system according to the invention.

Figure 5:
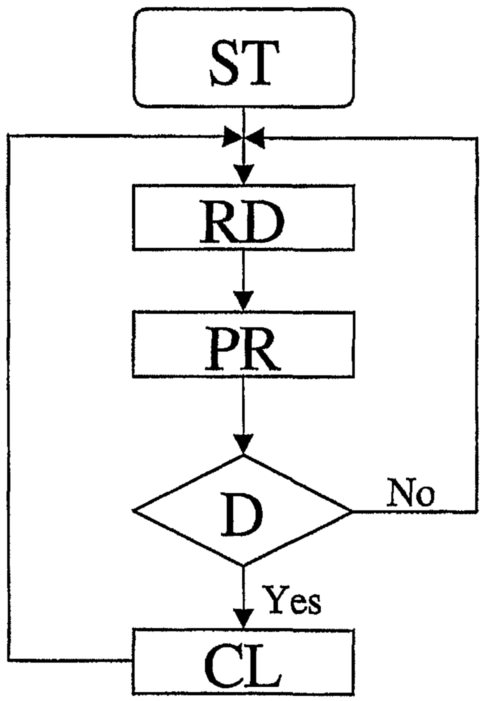
FIG. 5 shows a flow diagram which illustrates a possible control algorithm for the operating system.

FIG. 5 shows a flow diagram for an operation management algorithm which can be implemented in the microprocessor EU. Its functional units are as follows:

ST: start step (STart): here the system considers that the awning has just reached an extended position and starts verification of the stresses produced by the wind.

RD: reading step (ReaDing): the microprocessor EU starts to read the data from the sensor SS, sampling it and converting it into digital form.

PR: processing step (PRocessing): the microprocessor EU processes the data/samples, referred to as Ci, from the sensor SS. It inserts them as they are received into a buffer FIFO, if necessary performs filtering thereof via a low-pass filter IIR and, for n samples C, calculates the moving average Av and then the simple variance V using the following formulae:

$$Av = \frac{\sum_{i=1}^{n} C_i}{N};$$

$$V = \frac{\sum_{i=1}^{n} \left| C_i^{3\_0} Av \right|}{N}.$$

D: Decisional step: certain criteria for establishing whether there is a dangerous wind are determined: when the awning 20 is in the rest condition, Av is constant and V is zero, whereas, when there is a strong wind, V is not equal to zero and Av is still approximately constant and close to zero. Once a maximum threshold T has been established for V:

if V>T→action is taken, passing to step CL;

if V≤T→no action is taken, and step RD is returned to.

CL: Closing step (CLosing): the microprocessor EU performs closing of the awning 20, for example by an amount proportional to the deviation value |V−T|.

In the case of the algorithm described here it is possible to implement all the variants described above, for example thresholds T which are not constant and/or are dependent on the position of the awning.

The invention claimed is:

1. Control method used within an operating system for roller blinds having an output shaft of a motor which transfers rotational movement to a drum onto which the roller blind is wound, said method comprising the following steps:

(i) detecting directly or indirectly one or more of force external to the operating system acting on the drum, or on a member connected thereto, and relative position of the drum, or of a member connected thereto, due to the external force with respect to a part which is one or more of fixed and integral with the operating system;

(ii) obtaining from the detection operation performed in step (i) a zero value representing a stable rest condition of the roller blind;

(iii) starting an automatic closing movement of the roller blind should one or more of said external force and said relative position vary, with respect to the zero value obtained during step (ii), beyond a predefined threshold.

2. Method according to claim 1 in which step (i) is performed only when the motor is not running.

3. Method according to claim 1, in which, during step (i), an angular position of the drum is detected with respect to a fixed point.

4. Method according to claim 1, in which, during step (i), the position of the drum within a mechanical play obtained during coupling between the drum and the output shaft of the motor is detected.

5. Method according to claim 1, in which, during step (i), the force acting on the drum, or on the member connected thereto, is detected by means of measurement of one or more of torque and torsional load imparted to the drum or the member connected thereto.

6. Method according to claim 1, in which automatic closing of the roller blind is performed in several stages, dividing travel path of the roller blind into several control points where step (i) is performed and at said points the roller blind stops and checked whether stress causing start of a closing movement is present.

7. Method according to claim 1, in which said predefined threshold is one or more of programmed at discretion of a user and belonging to a set of threshold values.

8. Method according to claim 7, in which the threshold values are associated univocally with control points along a travel path of the roller blind.

9. Method according to claim 1, in which, during an installation of the operating system, a time profile of values of one or more of the force acting on the drum, a torsional load imparted to the drum, and said relative position of the drum is stored by means of sampling and, during a subsequent time interval for mechanical stabilization of an awning of the roller blind, in step (iii) the said threshold is applied to the values.

10. Method according to claim 1, in which detection of said zero value during step (i) is delayed by a predetermined, fixed or variable, time delay so as to allow lapsing of time for mechanical stabilization of the roller blind.

11. Method according to claim 1, in which, should one or more of said force and said relative position vary, with respect to the zero value obtained during step (ii), beyond a predefined threshold, a subroutine containing commands for responding to a presumed break-in is initiated.

12. Method according to claim 1, in which, during step (ii), said zero value is obtained as a temporal mean of various samples acquired and during step (iii) variance of the samples from said mean is calculated and corresponding difference then compared with said threshold.

13. Operating system for roller blinds, having an output shaft of a motor which transfers rotational movement to a drum onto which a roller blind is wound, the operating system comprising a device for protection against vibrations or impacts acting on the roller blind or caused by external agents, wherein the protection device comprises:

a sensor for detecting directly or indirectly one or more of force external to the operating system acting on the drum, or on a member connected thereto, and relative position of the drum, or of a member connected thereto, due to the external force with respect to a part which is one or more of fixed and integral with the operating system;

a processing unit preset for (i) obtaining a zero value representing a stable rest condition for the roller blind from said one or more external force and relative position detected via the sensor and (ii) performing an automatic closing movement of the roller blind should one or more of said force and said relative position vary with respect to the zero value beyond a predefined threshold.

14. Operating system according to claim 13, in which said unit is preset to read data of the sensor when the motor is not running.

15. Operating system according to claim 13, comprising a mechanical play in connection between the drum, or said member connected to the drum, and the shaft of the motor, and comprising a sensor able to detect position of the drum within said play.

16. Operating system according to claim 13, comprising a sensor able to detect the force acting on the drum by measuring one or more of torque and torsional load imparted to the drum.

17. Operating system according to claim 13, in which the unit is programmed to cause automatic closing of the roller blind in several stages, dividing travel path of the roller blind into several control points where the roller blind is stopped and said sensor interrogated in order to check whether stress causing start of a closing movement is present.

18. Operating system according to claim 13, comprising a programming interface for allowing a user to program said threshold.

19. Operating system according to claim 13, comprising a memory for recording a set of separate threshold values to be used as operands for said predefined threshold.

20. Operating system according to claim 19, in which the threshold values are associated univocally with control points along a travel path of the roller blind.

21. Operating system according to claim 13, comprising sampling means for storing, during an installation of the operating system, a time profile of values read by the sensor, the unit being programmed to apply said predefined threshold to the values during a subsequent time interval for mechanical stabilization of an awning of the roller blind.

22. Operating system according to claim 13, in which the unit is programmed to detect said zero value with a predetermined, fixed or variable, time delay, so as to allow lapsing of a transient for mechanical stabilization of the roller blind.

23. Operating system according to claim 13, in which the unit is programmed to carry out a subroutine containing commands for managing a presumed break-in, should said relative position vary, with respect to said zero value, beyond a predefined threshold.

24. Operating system according to claim 13, in which the unit is programmed to obtain the zero value as a temporal mean of various samples acquired by the sensor and to calculate variance of the samples from said mean and then compare corresponding difference with said predefined threshold.

25. Operating system according to claim 13, in which said sensor comprises one or more of a load cell and a strain gauge which are positioned on at least one of the output shaft, or between a head of the motor and an associated wall support, or on any component of the motor subject to forces induced by an awning or rolling shutter of the roller blind.

26. Method according to claim 1, in which variance of the one or more of said force and said relative position beyond the predefined threshold representing a condition whereby the roller blind is subject to damage or malfunction.

27. Operating system according to claim 13, wherein variance of the one or more of said force and said relative position beyond the predefined threshold representing a condition whereby the roller blind is subject to damage or malfunction.

* * * * *